US012728878B2

(12) United States Patent
Park

(10) Patent No.: US 12,728,878 B2
(45) Date of Patent: Sep. 8, 2026

(54) VEHICLE WITH COLLISION WARNING DETECTION AND CONTROL METHOD THEREOF

(71) Applicants: Hyundai Motor Company, Seoul (KR); Kia Corporation, Seoul (KR)

(72) Inventor: Min Ha Park, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

(21) Appl. No.: 18/812,248

(22) Filed: Aug. 22, 2024

(65) Prior Publication Data

US 2025/0100574 A1 Mar. 27, 2025

(30) Foreign Application Priority Data

Sep. 27, 2023 (KR) ........................ 10-2023-0130251

(51) Int. Cl.

| | |
|---|---|
| ***B60W 50/14*** | (2020.01) |
| ***B60Q 1/46*** | (2006.01) |
| ***B60Q 1/50*** | (2006.01) |
| ***B60W 30/09*** | (2012.01) |
| ***B60W 30/095*** | (2012.01) |
| ***B60W 30/16*** | (2020.01) |
| ***B60W 30/182*** | (2020.01) |
| ***B60W 50/00*** | (2006.01) |
| ***B60W 60/00*** | (2020.01) |

(52) U.S. Cl.

CPC ............... *B60W 50/14* (2013.01); *B60Q 1/46* (2013.01); *B60Q 1/535* (2022.05); *B60W 30/09* (2013.01); *B60W 30/0956* (2013.01); *B60W 30/16* (2013.01); *B60W 30/182* (2013.01); *B60W 60/0015* (2020.02); *B60W 2050/0071* (2013.01); *B60W 2520/10* (2013.01); *B60W 2554/4042* (2020.02); *B60W 2554/802* (2020.02); *B60W 2556/45* (2020.02)

(58) Field of Classification Search

None

See application file for complete search history.

(56) References Cited

U.S. PATENT DOCUMENTS

2002/0198632 A1* 12/2002 Breed ..................... G01S 17/86 701/472

2005/0134440 A1* 6/2005 Breed ................. B60N 2/2863 701/45

(Continued)

FOREIGN PATENT DOCUMENTS

| | | | | |
|---|---|---|---|---|
| JP | 2021-088245 | A | | 6/2021 |
| JP | 2023099382 | A | * | 7/2023 |
| KR | 10-2022-0084266 | A | | 6/2022 |

*Primary Examiner* — Fekadeselassie Girma

(74) *Attorney, Agent, or Firm* — Fox Rothschild LLP

(57) ABSTRACT

A vehicle includes: a sensing unit configured to sense an outside/inside environment of the vehicle; a drive controller configured to receive sensing information from the sensing unit and control the vehicle; and a warning unit configured to output a warning signal under the control of the drive controller, where the drive controller is configured to: analyze the sensing information, and determine whether there is a probability of collision with a rear vehicle approaching from behind the vehicle; and when it is determined that there is the probability of collision with the rear vehicle, output a warning signal to at least one of the vehicle and the rear vehicle.

20 Claims, 7 Drawing Sheets

(56) References Cited

U.S. PATENT DOCUMENTS

| | | | | |
|---|---|---|---|---|
| 2019/0256090 | A1* | 8/2019 | Yoo | B60W 30/095 |
| 2021/0203418 | A1* | 7/2021 | Ge | H04B 10/116 |
| 2021/0354525 | A1 | 11/2021 | Katoh et al. | |
| 2021/0407294 | A1* | 12/2021 | Ge | H04B 10/116 |
| 2022/0068138 | A1* | 3/2022 | Kang | G08G 1/167 |
| 2023/0182725 | A1* | 6/2023 | Li | B60W 30/0956<br>701/301 |
| 2023/0322216 | A1* | 10/2023 | Lee | B60W 30/0956 |
| 2024/0351615 | A1* | 10/2024 | Song | B60W 30/18163 |

* cited by examiner

VEHICLE WITH COLLISION WARNING DETECTION AND CONTROL METHOD THEREOF

CROSS-REFERENCE TO RELATED APPLICATION

This application claims under 35 U.S.C. § 119 (a) the benefit of Korean Patent Application No. 10-2023-0130251, filed on Sep. 27, 2023, the entire contents of which are incorporated by reference herein.

BACKGROUND

(a) Technical Field

The present disclosure relates to a vehicle with collision warning detection and a control method thereof.

(b) Description of the Related Art

A vehicle may include a front obstacle sensor (e.g., a front lidar sensor) that measures the distance to a measurement object present before the vehicle in three dimensions using laser light; a rear obstacle sensor (e.g., a rear lidar sensor) that measures the distance to a measurement object present behind the vehicle in three dimensions using laser light; an obstacle sensing unit that detects obstacles based on measurement information from the front and rear obstacle sensors; a collision avoidance controller that performs collision avoidance control to avoid a collision with an obstacle detected by the obstacle sensing unit, and the like.

In addition, when the vehicle travels forward based on forward and backward switching, the front obstacle sensor may perform the measurement, and the obstacle sensing unit may be switched to a forward detection state that detects obstacles based on the measurement information of the front obstacle sensor. Also, when the vehicle travels backward, the rear obstacle sensor may perform the measurement, and the obstacle sensing unit may be switched to a backward detection state that detects obstacles based on the measurement information of the rear obstacle sensor (for example, refer to Japanese Patent Laid-Open No. 2019-168888).

SUMMARY

An object of the present disclosure is to provide a vehicle and its control method that may predict an approach of a vehicle that is predicted to collide as it approaches from behind the vehicle while the vehicle is stopped/driving and may avoid such a potential collision and warn of this based on a predicted result.

The technical objects to be achieved by the present disclosure are not limited to those described above, and other technical objects not described above may also be clearly understood by those skilled in the art from the following description.

To solve the preceding technical problems, according to an embodiment of the present disclosure, there is provided a method of controlling a vehicle comprising a drive controller configured to control the vehicle by receiving sensing information from a sensing unit, the method comprising under control of the drive controller, analyzing the sensing information of an outside/inside environment of the vehicle, determining that there is a probability of collision with a rear vehicle approaching from behind the vehicle, and in response that it is determined that there is a probability of collision with the rear vehicle, outputting a warning signal to at least one of the vehicle and the rear vehicle through a warning unit.

In addition, the determining of there being a probability of collision with a rear vehicle may include, under the control of the drive controller, determining a distance between the vehicle and the rear vehicle based on a speed of the vehicle and a speed of the rear vehicle using the sensing information, and determining that there is a probability of collision with the rear vehicle based on a result of the determining of the distance.

In addition, the determining of there being a probability of collision with a rear vehicle may further include, under the control of the drive controller, in response of a determination result that the speed of the rear vehicle is faster than the speed of the vehicle, the speed of the rear vehicle exceeds a preset safety speed, or the distance between the vehicle and the rear vehicle is shorter than a preset safety distance, determining that there is a probability of collision with the rear vehicle.

In addition, the method may include, under the control of the drive controller, in response of a determination result that there is a probability of collision with the rear vehicle, activating a forced mode that forcibly controls the vehicle overriding a driver's control.

In addition, the method may include, under the control of the drive controller, in response that the forced mode is activated, determining that there is an avoidance space in front of the vehicle and around the front of the vehicle to avoid a collision with the rear vehicle, using the sensing information.

In addition, the method may include, under the control of the drive controller, in response of a determination result that the avoidance space is present, moving the vehicle to the avoidance space and checking a probability of a collision with the rear vehicle.

In addition, the method may include, under the control of the drive controller, in response of a determination result that the avoidance space is not present, predicting a collision location at which a collision with the rear vehicle is likely to occur, and activating an avoidance unit configured to change a state of the vehicle based on the predicted collision location.

In addition, the method may include, under the control of the drive controller, in response that the vehicle and the rear vehicle collide after the avoidance unit is activated, outputting and transmitting externally at least one of location information about the collision location and help request information.

In addition, the method may include, under the control of the drive controller, changing, by the avoidance unit, the state of the vehicle differently depending on a type of the rear vehicle.

In addition, the driver controller may comprise a processor.

To solve the preceding technical problems, according to an embodiment of the present disclosure, there is provided a non-transitory computer-readable storage medium storing instructions that, when executed by a processor, cause the processor to perform the method of controlling a vehicle. In particular, a non-transitory computer readable medium may contain program instructions executed by a processor, the computer readable medium including: program instructions that analyze sensing information of an outside/inside environment of the vehicle received from a sensing unit; program instructions that determine that there is a probability of collision with a rear vehicle approaching from behind the vehicle; and in response to determining that there is the probability of collision with the rear vehicle, program instructions that output a warning signal to at least one of the vehicle and the rear vehicle through a warning unit.

To solve the preceding technical problems, according to an embodiment of the present disclosure, there is provided a vehicle including a sensing unit configured to sense an outside/inside environment of the vehicle, a drive controller configured to receive sensing information from the sensing unit and control the vehicle, and a warning unit configured to output a warning signal under the control of the drive controller, wherein the drive controller is further configured to analyze the sensing information, and determine that there is a probability of collision with a rear vehicle approaching from behind the vehicle, and in response that it is determined that there is a probability of collision with the rear vehicle, output a warning signal to at least one of the vehicle and the rear vehicle through the warning unit.

In addition, the drive controller may be configured to determine a distance between the vehicle and the rear vehicle based on a speed of the vehicle and a speed of the rear vehicle using the sensing information, and determine that there is a probability of collision with the rear vehicle based on a result of the calculating.

In addition, the drive controller may be configured to in response of a determination result that the speed of the rear vehicle is faster than the speed of the vehicle, the speed of the rear vehicle exceeds a preset safety speed, or the distance between the vehicle and the rear vehicle is shorter than a preset safety distance, determine that there is a probability of collision with the rear vehicle.

In addition, the drive controller may be configured to in response of a determination result that there is a probability of collision with the rear vehicle, activate a forced mode that forcibly controls the vehicle overriding a driver's control in the vehicle.

In addition, the drive controller may be configured to in response that the forced mode is activated, determine that there is an avoidance space in front of the vehicle and around the front of the vehicle to avoid a collision with the rear vehicle, using the sensing information.

In addition, the drive controller may be configured to in response of a determination result that the avoidance space is present, move the vehicle to the avoidance space and check a probability of a collision with the rear vehicle.

In addition, the drive controller may be configured to in response of a determination result that the avoidance space is not present, predict a collision location at which a collision with the rear vehicle is likely to occur; and activate an avoidance unit configured to change a state of the vehicle based on the predicted collision location.

In addition, the drive controller may be configured to in response that the vehicle and the rear vehicle collide after the avoidance unit is activated, output and transmit externally at least one of location information about the collision location and help request information.

In addition, the drive controller may be configured to change, through the avoidance unit, the state of the vehicle differently depending on a type of the rear vehicle.

The vehicle and its control method of the present disclosure configured as described above may minimize human and property damage by vehicle safety control and active control through forced button start in preparation for a threat of rear collision while the vehicle is stopped/driving.

In addition, the vehicle and its control method of the present disclosure configured as described above may improve driver safety by detecting and warning of an approach of a vehicle that is predicted to collide from behind while the vehicle is stopped/driving.

In addition, the vehicle and its control method of the present disclosure configured as described above may improve safety by actively preventing a collision without colliding with other vehicles, pedestrians, and bicycle riders ahead while the vehicle is stopped/driving.

In addition, the vehicle and its control method of the present disclosure configured as described above may improve driver safety by changing to a mode that ensures safety in the event of a collision when active collision avoidance is not operable.

The effects that can be achieved from the present disclosure are not limited to those described above, and other effects not described above may also be clearly understood by those skilled in the art from the following description.

DETAILED DESCRIPTION OF THE DISCLOSURE

Figure 1:
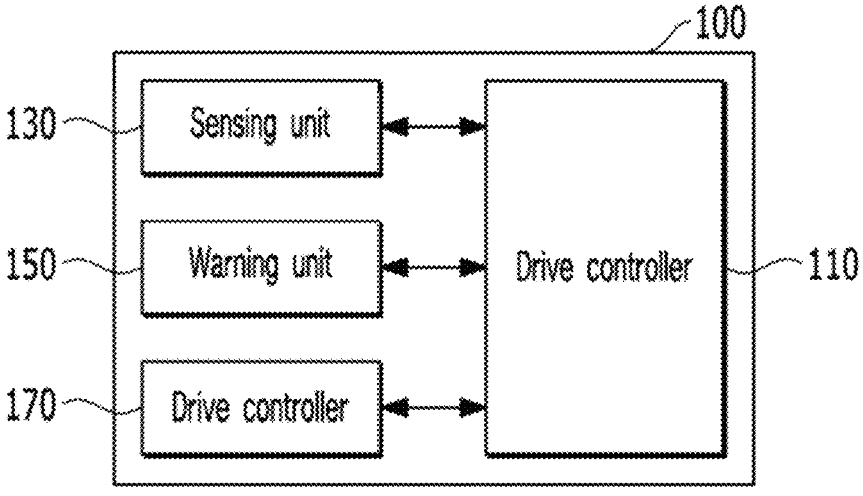
FIG. 1 is a block diagram illustrating a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings, and the same or similar elements will be given the same reference numerals regardless of reference symbols, and a repeated description thereof will be omitted. Further, when describing the embodiments, when it is determined that a detailed description of related publicly known technology obscures the gist of the embodiments described herein, the detailed description thereof will be omitted.

In addition, the terms "unit" and "control unit" included in names such as a vehicle control unit (VCU) may be terms widely used in the naming of a control device or controller configured to control vehicle-specific functions but may not be a term that represents a generic function unit. For example, each controller or control unit may include a communication device that communicates with other controllers or sensors to control a corresponding function, a memory that stores an operating system (OS) or logic commands and input/output information, and at least one vehicle controller that performs determination, calculation, selection, and the like necessary to control the function. The vehicle controller may also be referred to herein as a drive controller.

FIG. 1 is a block diagram illustrating a vehicle according to an embodiment of the present disclosure.

Referring to FIG. 1, according to an embodiment of the present disclosure, a vehicle 100 may include a drive controller 110, a sensing unit 130, a warning unit 150, and an avoidance unit 170.

Each of the above units may constitute modules and/or devices of the vehicle 100, which may include one or more controllers. For example, the above units of the vehicle 100 may constitute hardware components that form part of a controller (e.g., modules or devices of a high-level controller), or may constitute individual controllers each having a processor and memory. The vehicle 100 may include one or more processors and memory.

The drive controller 110 may be electrically connected to the sensing unit 130, the warning unit 150, and the avoidance unit 170, and configured to receive various signals and information from each of them, analyze the received signals and information, and perform determination based on analysis results obtained by the analyzing. The drive controller 110 may also be referred to as a vehicle controller or processor. A detailed description thereof will follow.

The sensing unit 130 may be mounted on the vehicle 100 and may detect the front of the vehicle 100, the rear of the vehicle 100, the sides of the vehicle 100, the surrounding area of the vehicle 100, and the like. The sensing unit 130 may also be referred to as a detection sensor. The sensing unit 130 may include, as non-limiting examples, a radar, a camera, a lidar, an ultrasonic sensor, a night vision infrared camera, and the like.

Under the control of the drive controller 110, the sensing unit 130 may monitor in real time the surroundings of the vehicle 100 in addition to the outside/inside of the vehicle 100 while the vehicle 100 is parked, stopped, or driving, and may provide sensing information obtained by the monitoring to the drive controller 110.

The warning unit 150 may be mounted on the vehicle 100 and output a warning signal. For example, under the control of the drive controller 110, the warning unit 150 may output a warning signal to allow a driver and passengers in the vehicle 100 to recognize a state of the vehicle 100 or a surrounding state of the vehicle 100. The warning unit 150 may include, as non-limiting examples, cluster warning, steering wheel haptics, seat vibration, emergency lights, horn, and the like.

Under the control of the drive controller 110, the avoidance unit 170 may change the state of the vehicle 100 to protect the driver and passengers on board the vehicle 100. The avoidance unit 170 may also be referred to as an active avoidance unit or an active avoidance system unit.

For example, under the control of the drive controller 110, the avoidance unit 170 may adjust or change the state of the vehicle 100, which involves, for example, a passenger detection sensor, forced button start, speed control (drive motor control/throttle control/smart cruise speed up/down, etc.) for the vehicle 100, steering wheel control (e.g., motor driven power steering (MDPS)), electronically controlled suspension (ECS), braking control (e.g., electronic stability control (ESC)), an electronic parking brake (EPB), a steering angle sensor (SAS), seat position control, ride height control, seatbelt adjustment, and the like, to minimize potential injuries and damage to the driver and passengers in case of a collision of the vehicle 100 with a vehicle behind (hereinafter, a "rear vehicle").

As described above, the drive controller 110 may be electrically connected to the sensing unit 130, the warning unit 150, and the avoidance unit 170 to control them. For example, the drive controller 110 may analyze the sensing information provided by the sensing unit 130 configured to monitor or sense the outside/inside of the vehicle 100 and may determine whether there is a probability of collision with a rear vehicle 200 approaching from behind the vehicle 100. When it is determined that there is a probability of collision with the rear vehicle 200, the drive controller 110 may output a warning signal to at least one of the vehicle 100 and the rear vehicle 200 through the warning unit 150.

For example, the drive controller 110 may calculate a distance between the vehicle 100 and the rear vehicle 200 based on a speed of the vehicle 100 and a speed of the rear vehicle 200 using the sensing information, and may determine whether there is a probability of collision with the rear vehicle 200 based on a result of the calculating.

For example, when the speed of the rear vehicle 200 is faster than the speed of the vehicle 100, the speed of the rear vehicle 200 exceeds a preset safety speed, or the distance between the vehicle 100 and the rear vehicle 200 is shorter than a preset safety distance, the drive controller 110 may determine that there is a probability of collision with the rear vehicle 200. This will be described in detail below with reference to FIGS. 2 to 7.

FIGS. 2 to 5 are diagrams illustrating a collision probability and an avoidance method according to an embodiment of the present disclosure.

Referring to FIGS. 2 to 5, according to an embodiment of the present disclosure, the drive controller 110 may receive sensing information through the sensing unit 130 and analyze the sensing information, and determine whether there is a probability of collision with the rear vehicle 200 based on resulting values obtained by the analysis.

Figure 2:
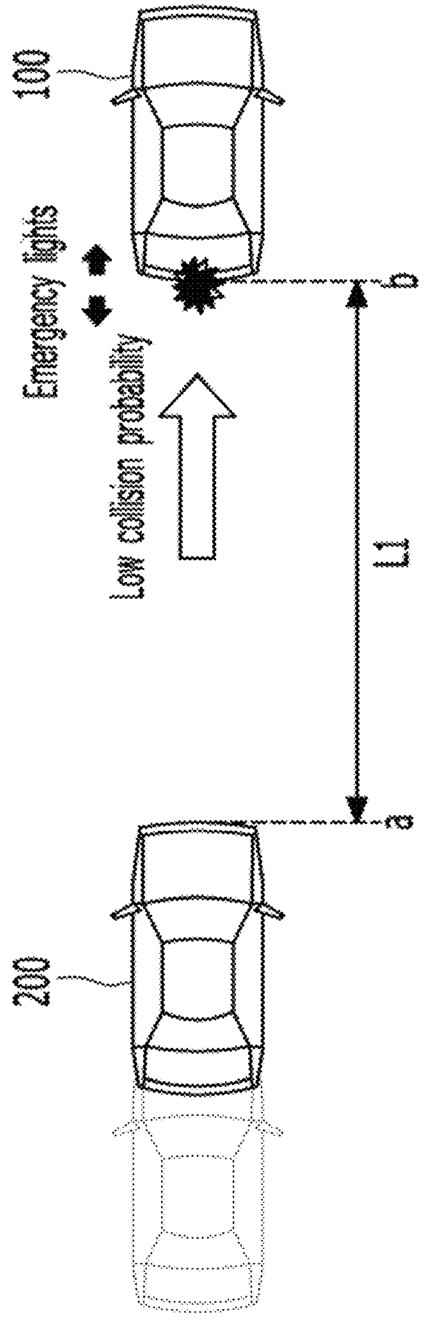
FIGS. 2 to 5 are diagrams illustrating a collision probability and a collision avoidance method according to an embodiment of the present disclosure.

For example, as shown in FIG. 2, when calculating the distance between the vehicle 100 and the rear vehicle 200 based on the speed of the vehicle 100 and the speed of the rear vehicle 200 using the sensing information, the drive controller 110 may determine that the probability of collision with the rear vehicle 200 is low, in response to a calculated resulting value indicating that the speed of the rear vehicle 200 is slower than the speed of the vehicle 100, the speed of the rear vehicle 200 does not exceed a preset safety speed, or the distance between the vehicle 100 and the rear vehicle 200 is longer than a preset safety distance L1. Accordingly, the drive controller 110 may output a warning signal and operate the emergency lights.

That is, under the control of the drive controller 110, the vehicle 100 may determine that the probability of collision is low when reducing speed is necessary based on speed information about the rear vehicle 200 approaching the vehicle 100, and provide the emergency lights as the warning signal.

Figure 3:
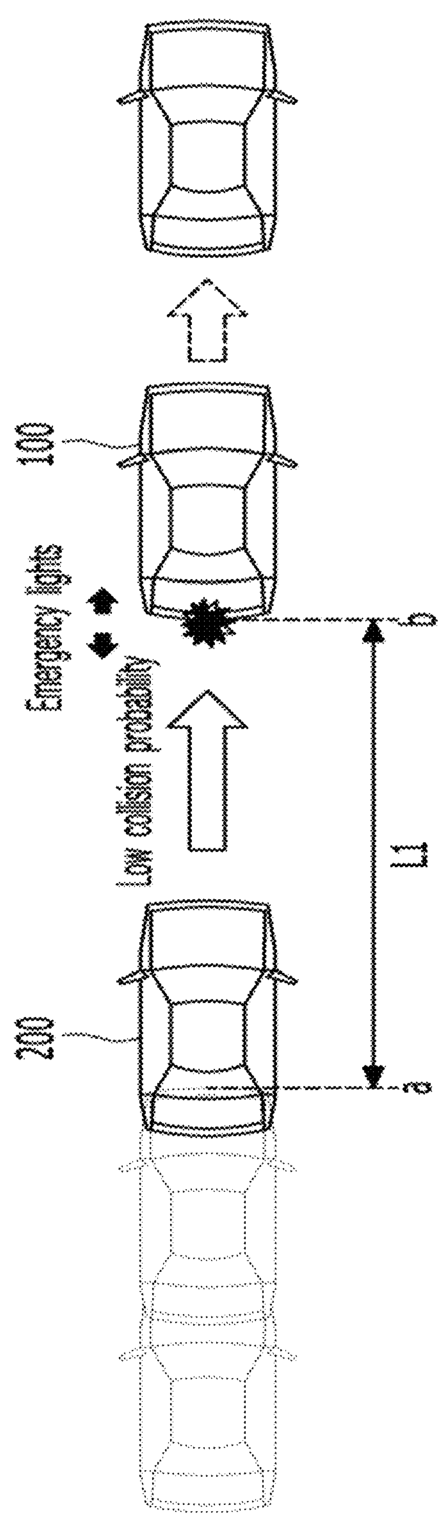

In addition, as shown in FIG. 3, when calculating the distance between the vehicle 100 and the rear vehicle 200 based on the speed of the vehicle 100 and the speed of the rear vehicle 200 using the sensing information, the drive controller 110 may determine that the probability of collision with the rear vehicle 200 is high, in response to a calculated resulting value indicating that the speed of the rear vehicle 200 exceeds the preset safety speed or the distance between the rear vehicle 200 and the vehicle 100 is shorter than the preset safety distance L1.

When it is determined that the probability of collision with the rear vehicle 200 is high, the vehicle 100 may output the warning signal to at least one of the vehicle 100 and the rear vehicle 200, under the control of the drive controller 110.

The vehicle 100 may then activate a forced mode that may forcibly control the vehicle 100 regardless of the intention of the driver in the vehicle 100, under the control of the drive controller 110.

For example, the forced mode may be a mode that, in a case where the vehicle 100 is in a start-off state, forces the vehicle 100 to start and travel by a predetermined distance.

When the forced mode is activated, the vehicle 100 may determine whether there is an avoidance space in front of the vehicle 100 or around the front of the vehicle 100 to avoid a collision with the rear vehicle 200 using the sensing information, under the control of the drive controller 110. When it is determined that there is an avoidance space, the vehicle 100 may travel to the avoidance space, under the control of the drive controller 110.

For example, when it is determined that the probability of collision is still high even though the rear vehicle 200 approaching from behind reduces the speed, the vehicle 100 may forcibly operate the D gear based on whether there is a space from a vehicle ahead (hereinafter, a "front vehicle"), and may travel only by a distance that suffices to avoid a collision with the rear vehicle 200 while operating warning lights, under the control of the drive controller 110.

Figure 4:
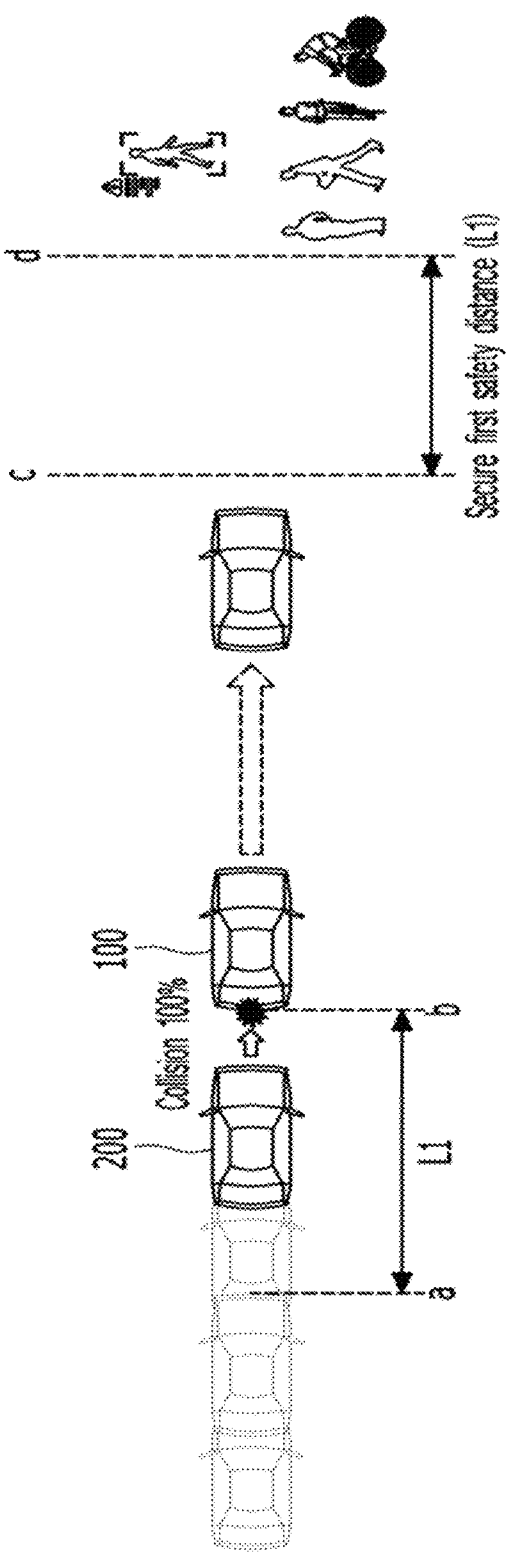
Figure 5:
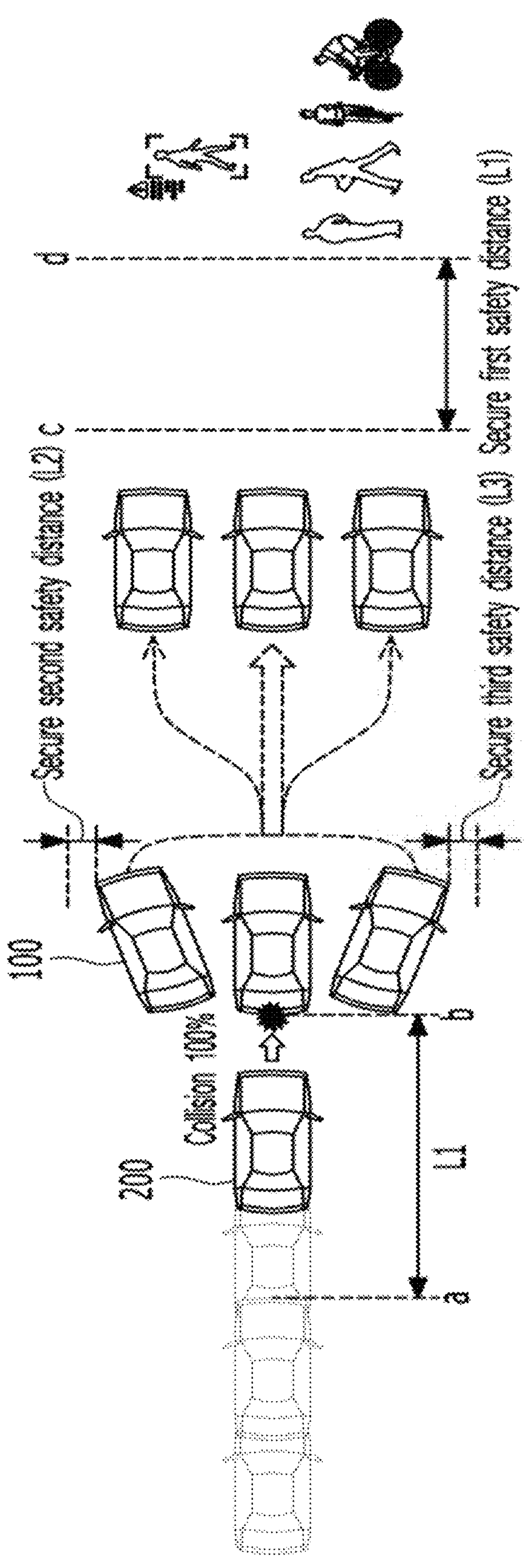

In addition, as shown in FIGS. 4 and 5, when calculating the distance between the vehicle 100 and the rear vehicle 200 based on the speed of the vehicle 100 and the speed of the rear vehicle 200 using the sensing information, the drive controller 110 may determine that the probability of collision with the rear vehicle 200 is extremely high or 100%, in response to a calculated resulting value indicating that the speed of the rear vehicle 200 exceeds the preset safety speed or the distance between the vehicle 100 and the rear vehicle 200 is shorter than the preset safety distance L1.

Accordingly, when it is determined that the probability of collision with the rear vehicle 200 is extremely high or 100%, the vehicle 100 may output the warning signal to at least one of the vehicle 100 and the rear vehicle 200, under the control of the drive controller 110.

The vehicle 100 may then activate the forced mode that may forcibly control the vehicle 100 regardless of the intention of the driver in the vehicle 100, under the control of the drive controller 110.

When the forced mode is activated, the vehicle 100 may determine whether there is an avoidance space in front of the vehicle 100 or around the front of the vehicle 100 to avoid a collision with the rear vehicle 200 using the sensing information, under the control of the drive controller 110. When it is determined that there is an avoidance space, the vehicle 100 may travel to the avoidance space at a speed faster than that of the rear vehicle 200, under the control of the drive controller 110.

For example, when the rear vehicle 200 approaches the vehicle 100 without reducing the speed, the vehicle 100 may forcibly operate the D gear and forcibly avoid and drive with an accelerator while operating the warning lights, under the control of the drive controller 110. In this case, the vehicle 100 may operate the warning lights while securing a first safety distance L4 from a front vehicle or nearby objects or people, and operate the accelerator to forcibly operate the D gear to travel while avoiding the rear vehicle 200.

In contrast, as shown in FIG. 5, the vehicle 100 may operate the warning lights while securing second and third safety distances L2 and L3 from neighboring vehicles on sides or nearby objects or people, and operate the accelerator to forcibly operate the D gear to travel while avoiding the rear vehicle 200.

Figure 6:
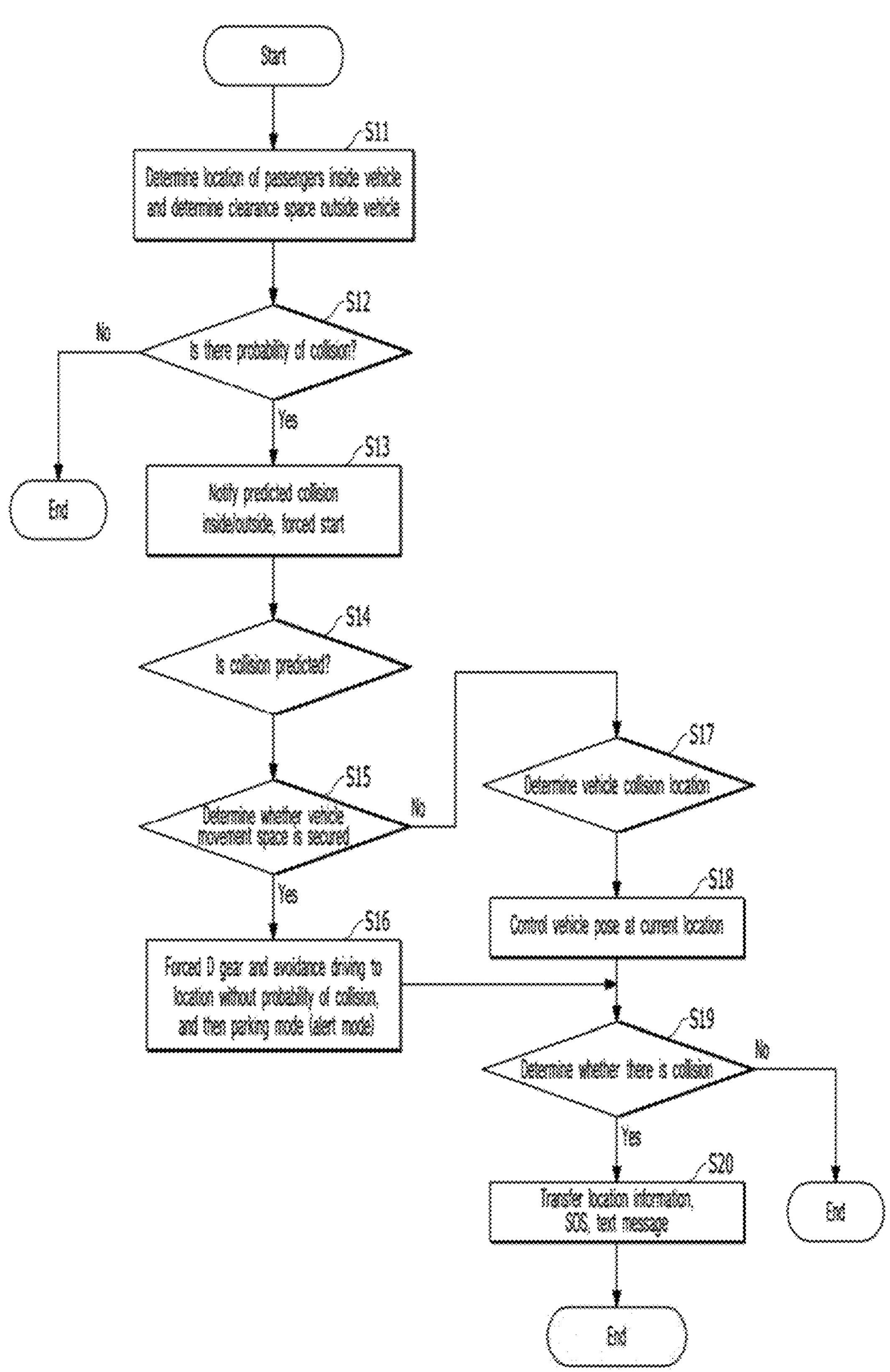
FIG. 6 is a flowchart illustrating a method of controlling a vehicle that is stopped/parked according to an embodiment of the present disclosure.

FIG. 6 is a flowchart illustrating a method of controlling a vehicle being stopped/parked according to an embodiment of the present disclosure.

Referring to FIG. 6, the method of controlling the vehicle 100 being stopped/parked according to an embodiment of the present disclosure is as follows.

In step S11, the vehicle 100 may receive sensing information provided by the sensing unit 130, analyze the sensing information, and identify the location of passengers inside the vehicle 100 and the presence or absence of a clearance space outside the vehicle 100, under the control of the drive controller 110.

In step S12, the vehicle 100 may then determine whether there is a probability of collision with the rear vehicle 200 based on the analyzed sensing information, under the control of the drive controller 110.

In step S13, when it is determined that there is a probability of collision with the rear vehicle 200, the vehicle 100 may output a predicted collision notification to the inside or outside of the vehicle 100, under the control of the drive controller 110. In this case, the vehicle 100 may forcibly turn on the start of the vehicle 100 under the control of the drive controller 110.

That is, under the control of the drive controller 110, the vehicle 100 may output the predicted collision notification inside or outside the vehicle 100 such that it provides a warning for the collision to a driver of the rear vehicle 200 in addition to the driver and passengers in the vehicle 100.

In step S14, the vehicle 100 may determine whether a collision with the rear vehicle 200 is predicted based on the analyzed sensing information, under the control of the drive controller 110. This has been already described in detail above with reference to FIGS. 2 to 5, and a more detailed and repeated description thereof will be omitted here for brevity.

In step S15, when the collision with the rear vehicle 200 is predicted, the vehicle 100 may determine whether a movement space for the vehicle 100 is secured, under the control of the drive controller 110. In this case, the movement space may be the avoidance space described above.

For example, in step S16, when the movement space for the vehicle 100 is secured, the vehicle 100 may forcibly operate the D gear to travel to a location at which there is no probability of collision while avoiding the collision, and may then switch from the forced mode to a parking mode (or alert mode), under the control of the drive controller 110.

In step S17, when the movement space for the vehicle 100 is not secured, the vehicle 100 may determine a collision location between the vehicle 100 and the rear vehicle 200, under the control of the drive controller 110.

That is, in step S18, when it is determined that there is no movement space or avoidance space, the vehicle 100 may predict the collision location at which a collision with the rear vehicle 200 is likely to occur, and activate the avoidance unit 170 to change a state of the vehicle 100 based on the predicted collision location, under the control of the drive controller 110.

However, examples are not limited to the preceding, and the vehicle 100 may activate the avoidance unit 170 but change the state of the vehicle 100 differently depending on a type of the rear vehicle 200, under the control of the drive controller 110.

For example, when the rear vehicle 200 is a large vehicle, the drive controller 110 may apply a broader change range of the state of the vehicle 100 compared to when the rear vehicle 200 is a small vehicle, and may thus more safely protect the driver or passengers in the vehicle 100.

When the vehicle 100 and the rear vehicle 200 collide in step S19 after the avoidance unit 170 is activated, the vehicle 100 may output at least one of location information about the collision location and help request information and transmit it to the outside in step S20, under the control of the drive controller 110.

Figure 7:
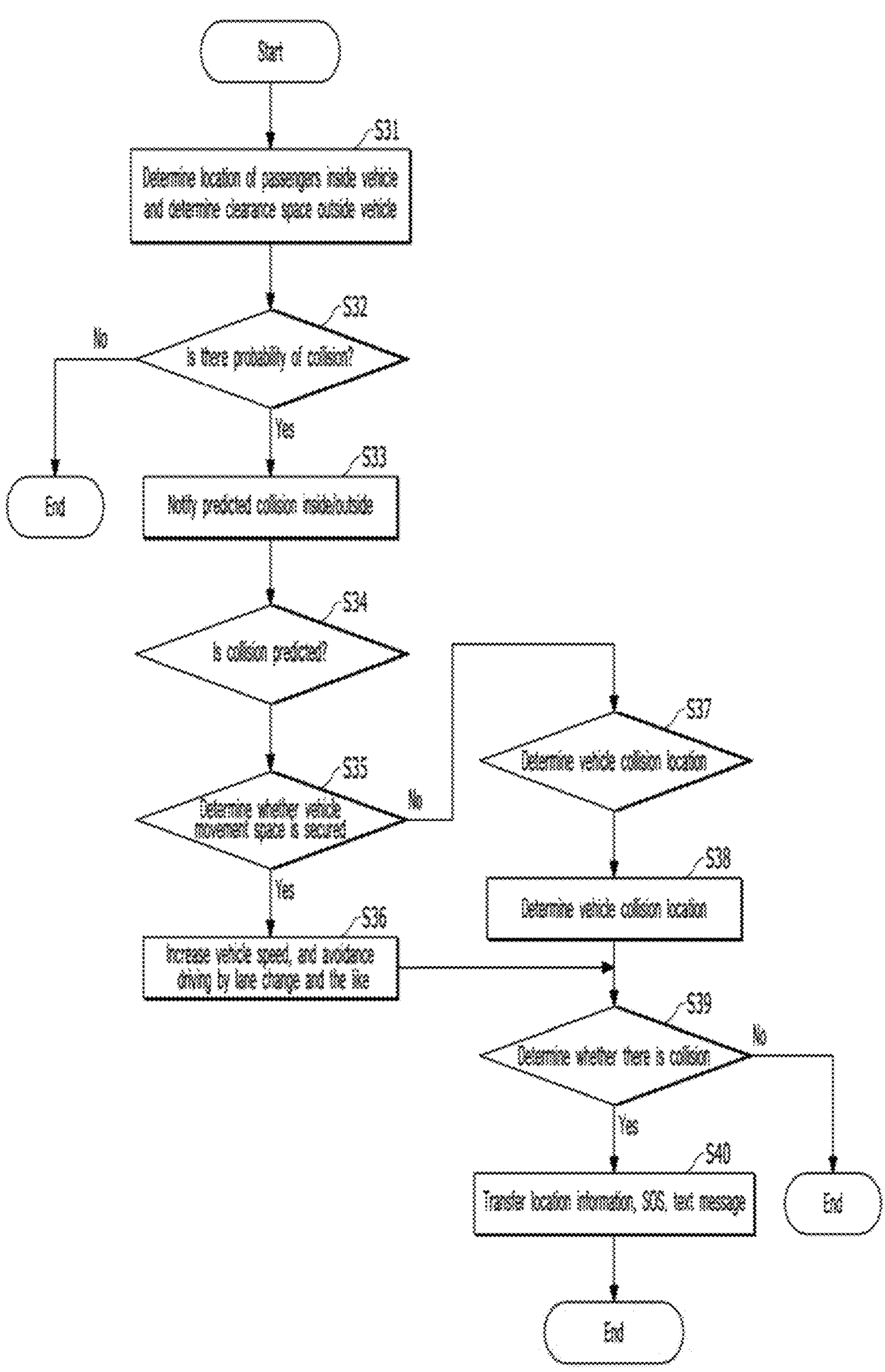
FIG. 7 is a flowchart illustrating a method of controlling a vehicle that is driving according to an embodiment of the present disclosure.

FIG. 7 is a flowchart illustrating a method of controlling a driving vehicle according to an embodiment of the present disclosure.

Referring to FIG. 7, the method of controlling the vehicle 100 that is currently traveling according to an embodiment of the present disclosure is as follows.

In step S31, the vehicle 100 may receive sensing information provided by the sensing unit 130, analyze the sensing information, and identify the location of passengers inside the vehicle 100 and the presence or absence of a clearance space outside the vehicle 100, under the control of the drive controller 110.

In step S32, the vehicle 100 may then determine whether there is a probability of collision with the rear vehicle 200 based on the analyzed sensing information, under the control of the drive controller 110.

In step S33, when it is determined that there is a probability of collision with the rear vehicle 200, the vehicle 100 may output a predicted collision notification to the inside or outside of the vehicle 100, under the control of the drive controller 110. In this case, the vehicle 100 may forcibly turn on the start of the vehicle 100 under the control of the drive controller 110.

That is, under the control of the drive controller 110, the vehicle 100 may output the predicted collision notification inside or outside the vehicle 100 such that it provides a warning for the collision to a driver of the rear vehicle 200 in addition to the driver and passengers in the vehicle 100.

In step S34, the vehicle 100 may determine whether a collision with the rear vehicle 200 is predicted based on the analyzed sensing information, under the control of the drive controller 110. This has been already described in detail above with reference to FIGS. 2 to 5, and a more detailed and repeated description thereof will be omitted here for brevity.

In step S35, when the collision with the rear vehicle 200 is predicted, the vehicle 100 may determine whether a movement space for the vehicle 100 is secured, under the control of the drive controller 110. In this case, the movement space may be the avoidance space described above.

For example, in step S36, when the movement space for the vehicle 100 is secured, the vehicle 100 may forcibly operate the D gear, and increase the speed of the vehicle 100 by an accelerator or change a lane to a lane on which there is no probability of collision to travel while avoiding the collision, under the control of the drive controller 110.

In step S37, when the movement space for the vehicle 100 is not secured, the vehicle 100 may determine a collision location between the vehicle 100 and the rear vehicle 200, under the control of the drive controller 110.

That is, in step S38, when it is determined that there is no movement space or avoidance space, the vehicle 100 may predict the collision location at which a collision with the rear vehicle 200 is likely to occur, and activate the avoidance unit 170 to change a state of the vehicle 100 based on the predicted collision location, under the control of the drive controller 110.

When the vehicle 100 and the rear vehicle 200 collide in step S39 after the avoidance unit 170 is activated, the vehicle 100 may output at least one of location information about the collision location and help request information and transmit it to the outside in step S40, under the control of the drive controller 110.

As described above, according to an embodiment of the present disclosure, under the control of the drive controller 110, the vehicle 100 may notify the driver and passengers in the vehicle 100 of a predicted collision through a warning sound, vibration, and the like.

In addition, according to an embodiment of the present disclosure, under the control of the drive controller 110, when securing a clearance space without a collision with pedestrians, bicycle riders, and the like in the front, rear, left, and right directions of the vehicle 100, the vehicle 100 may actively control a vehicle location and prevent a potential collision to minimize human and property damage in the event of a collision.

In contrast, under the control of the drive controller 110, when a collision avoidance space is insufficient, the vehicle 100 may change a pose of the vehicle 100 to minimize a collision, and identify the location of passengers to set the pose of the vehicle 100 to correspond to a damage minimizing location.

In addition, under the control of the drive controller 110, when there is no collision avoidance space, the vehicle 100 may perform seat control, direction change, ride height control, and braking control based on a current location of the vehicle 100, to minimize potential damage.

In addition, under the control of the drive controller 110, when, after sensors are activated in an alert mode while the vehicle 100 is stopped on a shoulder or road with the vehicle start being off, an external collision risk factor such as drowsy driving occurs, the vehicle 100 may perform forced start to provide a warning and travel while avoiding a collision, in a combined manner.

In addition, under the control of the drive controller 110, when the probability of collision during driving is 100%, the vehicle 100 may forcibly increase the speed or change a lane to improve the safety of the vehicle 100.

As described above, according to an embodiment of the present disclosure, under the control of a drive controller, a vehicle may notify a driver and passengers in the vehicle of a predicted collision through a warning sound, vibration, and the like.

In addition, according to an embodiment of the present disclosure, under the control of the drive controller, when securing a clearance space without a collision with pedestrians, bicycle riders, and the like in the front, rear, left, and right directions of the vehicle, the vehicle may actively control a vehicle location and prevent a potential collision to minimize human and property damage in the event of a collision.

In contrast, under the control of the drive controller, when a collision avoidance space is insufficient, the vehicle may change a pose of the vehicle to minimize a collision, and identify the location of passengers to set the pose of the vehicle to correspond to a damage minimizing location.

In addition, under the control of the drive controller, when there is no collision avoidance space, the vehicle may perform seat control, direction change, ride height control, and braking control based on a current location of the vehicle, to minimize potential damage.

In addition, under the control of the drive controller, when, after sensors are activated in an alert mode while the vehicle is stopped on a shoulder or road with the vehicle start being off, an external collision risk factor such as drowsy driving occurs, the vehicle may perform forced start to provide a warning and travel while avoiding a collision, in a combined manner.

In addition, under the control of the drive controller, when the probability of collision during driving is 100%, the vehicle may forcibly increase the speed or change a lane to improve the safety of the vehicle.

The embodiments of the present disclosure described herein may be implemented as computer-readable code on a medium in which a program is recorded. The computer-readable medium may include all types of recording devices that store data to be read by a computer system. The computer-readable medium may include, for example, a hard disk drive (HDD), a solid-state drive (SSD), a silicon disk drive (SDD), a read-only memory (ROM), a random-access memory (RAM), a compact disc ROM (CD-ROM), a magnetic tape, a floppy disk, an optical data storage device, and the like.

Accordingly, the preceding detailed description should not be construed as restrictive but as illustrative in all respects. The scope of the embodiments of the present disclosure should be determined by reasonable interpretation of the appended claims, and all changes and modifications within the equivalent scope of the present disclosure are included in the scope of the present disclosure.

What is claimed is:

1. A method of controlling a vehicle comprising a drive controller configured to control the vehicle, the method comprising:

analyzing, by the drive controller, sensing information of an outside/inside environment of the vehicle received from a sensing unit;

determining, by the drive controller, that there is a probability of collision with a rear vehicle approaching from behind the vehicle; and outputting, based on the probability of collision with the rear vehicle, a warning signal to at least one of the vehicle and the rear vehicle through a warning unit; and determining, by the drive controller, whether there is an avoidance space in front of the vehicle or around the front of the vehicle to avoid a collision with the rear vehicle, using the sensing information, wherein if the avoidance space is present, the method further comprises: driving the vehicle to the avoidance space, and wherein, if the avoidance space is not present, the method further comprises:

predicting, by the drive controller, a collision location at which the collision with the rear vehicle is likely to occur;

identifying, by the drive controller, locations of passengers in the vehicle; and changing, by the drive controller, a state of the vehicle based on the predicted collision location to minimize the collision, wherein changing the state of the vehicle comprises changing, based on the locations of the passengers, a position of the vehicle to correspond to a damage minimizing location.

2. The method of claim 1, wherein determining the probability of collision with the rear vehicle comprises:

determining, by the drive controller, a distance between the vehicle and the rear vehicle based on a speed of the vehicle and a speed of the rear vehicle using the sensing information; and determining, by the drive controller, that there is the probability of collision with the rear vehicle based on a result of determining the distance.

3. The method of claim 2, wherein determining the probability of collision with the rear vehicle further comprises:

in response to:

a determination result that the speed of the rear vehicle is faster than the speed of the vehicle, the speed of the rear vehicle exceeds a preset safety speed, or the distance between the vehicle and the rear vehicle is shorter than a preset safety distance, determining, by the drive controller, that there is the probability of collision with the rear vehicle.

4. The method of claim 3, further comprising:

in response to a determination result that there is the probability of collision with the rear vehicle, activating, by the drive controller, a forced mode that forcibly controls the vehicle overriding a driver's control.

5. The method of claim 4, further comprising, when the vehicle is stopped or parked, forcibly turning on an ignition of the vehicle by the drive controller.

6. The method of claim 4, further comprising:

in response to a determination result that the avoidance space is present, moving, by the drive controller, the vehicle to the avoidance space and checking a probability of a collision with the rear vehicle.

7. The method of claim 4, wherein changing the state of the vehicle comprises controlling at least one of a seat position, a traveling direction, a ride height, or a braking operation of the vehicle.

8. The method of claim 7, further comprising:

in response that the vehicle and the rear vehicle collide after the avoidance unit is activated, outputting and transmitting externally, by the drive controller, at least one of location information about the collision location and help request information.

9. The method of claim 7, further comprising:

changing, by the avoidance unit, the state of the vehicle differently depending on a type of the rear vehicle.

10. The method of claim 1, wherein the drive controller comprises a processor.

11. A vehicle, comprising:

a sensing unit configured to sense an outside/inside environment of the vehicle;

a drive controller configured to receive sensing information from the sensing unit and control the vehicle; and a warning unit configured to output a warning signal under the control of the drive controller, wherein the drive controller is further configured to:

analyze the sensing information, and determine that there is a probability of collision with a rear vehicle approaching from behind the vehicle;

output, based on the probability of collision with the rear vehicle, a warning signal to at least one of the vehicle and the rear vehicle through the warning unit; and determine whether there is an avoidance space in front of the vehicle or around the front of the vehicle to avoid a collision with the rear vehicle, using the sensing information, wherein if the avoidance space is present, the drive controller is further configured to: drive the vehicle to the avoidance space, and wherein, if the avoidance space is not present, the drive controller is further configured to:

predict a collision location at which the collision with the rear vehicle is likely to occur;

identify locations of passengers in the vehicle; and change a state of the vehicle based on the predicted collision location to minimize the collision, wherein changing the state of the vehicle comprises changing, based on the locations of the passengers, a position of the vehicle to correspond to a damage minimizing location.

12. The vehicle of claim 11, wherein the drive controller is further configured to:

determine a distance between the vehicle and the rear vehicle based on a speed of the vehicle and a speed of the rear vehicle using the sensing information, and determine that there is the probability of collision with the rear vehicle based on a result of the determining.

13. The vehicle of claim 12, wherein the drive controller is further configured to:

in response to:

a determination result that the speed of the rear vehicle is faster than the speed of the vehicle, the speed of the rear vehicle exceeds a preset safety speed, or the distance between the vehicle and the rear vehicle is shorter than a preset safety distance, determine that there is the probability of collision with the rear vehicle.

14. The vehicle of claim 13, wherein the drive controller is further configured to:

in response of a determination result that there is the probability of collision with the rear vehicle, activate a forced mode that forcibly controls the vehicle overriding a driver's control.

15. The vehicle of claim 14, wherein when the vehicle is stopped or parked, the drive controller is further configured to forcibly turn on an ignition of the vehicle.

16. The vehicle of claim 14, wherein the drive controller is further configured to:

in response of a determination result that the avoidance space is present, move the vehicle to the avoidance space and check a probability of a collision with the rear vehicle.

17. The vehicle of claim 14, wherein changing the state of the vehicle comprises controlling at least one of a seat position, a traveling direction, a ride height, or a braking operation of the vehicle.

18. The vehicle of claim 17, wherein the drive controller is further configured to:

in response that the vehicle and the rear vehicle collide after the avoidance unit is activated, output and transmit externally at least one of location information about the collision location and help request information.

19. The vehicle of claim 17, wherein the drive controller is further configured to:

change, through the avoidance unit, the state of the vehicle differently depending on a type of the rear vehicle.

20. A non-transitory computer readable medium containing program instructions executed by a processor, the computer readable medium comprising:

program instructions that analyze sensing information of an outside/inside environment of the vehicle received from a sensing unit;

program instructions that determine that there is a probability of collision with a rear vehicle approaching from behind the vehicle;

program instructions that output, based on the probability of collision with the rear vehicle, a warning signal to at least one of the vehicle and the rear vehicle through a warning unit; and program instructions that determine whether there is an avoidance space in front of the vehicle or around the front of the vehicle to avoid a collision with the rear vehicle, using the sensing information, wherein if the avoidance space is present, further comprising: program instructions that drive the vehicle to the avoidance space, and wherein, if the avoidance space is not present, further comprising:

program instructions that predict a collision location at which the collision with the rear vehicle is likely to occur;

program instructions that identify locations of passengers in the vehicle; and program instructions that change a state of the vehicle based on the predicted collision location to minimize the collision, wherein changing the state of the vehicle comprises changing, based on the locations of the passengers, a position of the vehicle to correspond to a damage minimizing location.

* * * * *